United States Patent Office 3,549,633
Patented Dec. 22, 1970

3,549,633
PROCESS FOR PREPARATION OF 1-H-IMIDAZO
[4,5-b]PYRAZIN-2-ONES
Edward J. J. Grabowski, Iselin, Edward W. Tristram,
Cranford, and Roger J. Tull, Metuchen, N.J., assignors
to Merck & Co., Inc., Rahway, N.J., a corporation of
New Jersey
No Drawing. Filed Nov. 20, 1968, Ser. No. 777,479
Int. Cl. C07d 51/76
U.S. Cl. 260—250                            15 Claims

ABSTRACT OF THE DISCLOSURE

A process is described for the preparation of 1H-imidazo[4,5-b]pyrazin-2-ones substituted in the 5 and 6 positions, which comprises heating of a 3-aminopyrazino-hydroxamic acid or O-acyl derivatives thereof which causes rearrangement and ring closure to the subject compounds. The products demonstrate activity as antihypertensive agents.

---

This invention relates to a novel process for the preparation of 5-amino(or substituted amino) - 6-chloro-1H-imidazo[4,5-b]pyrazin-2 - ones from novel 3 - amino-5-amino - (or substituted amino) - 6 - chloropyrazinohydroxamic acids and derivatives thereof. The process is represented by the following equation:

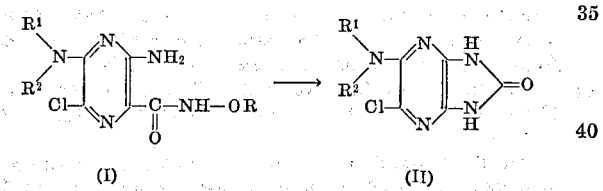

wherein

R represents (a) hydrogen,
(b) lower alkylcarbonyl of from 2 to about 5 carbon atoms, e.g., acetyl, propionyl, butyryl or pentanoyl, either straight or branched chain, and either unsubstituted or substituted with phenyl,
(c) mononuclear arylcarbonyl, especially phenylcarbonyl,
(d) lower alkylsulfonyl wherein the lower alkyl group has from 1 to about 3 carbon atoms, e.g., methanesulfonyl, ethanesulfonyl, or propanesulfonyl,
(e) mononuclear arylsulfonyl, especially phenylsulfonyl, either unsubstituted or substituted with such as lower alkyl, of from 1 to about 3 carbon atoms e.g., methyl, ethyl and propyl;

$R^1$ represents (a) hydrogen,
(b) lower cycloalkyl of from 3 to about 7 carbon atoms, e.g., cyclopropyl, cyclopentyl, cyclohexyl, cycloheptyl and the like,
(c) mononuclear aryl, especially phenyl,
(d) lower alkenyl such as allyl,
(e) lower alkyl of from 1 to about 6 carbon atoms either straight or branched chain such as methyl, ethyl, propyl, isopropyl, butyl, isobutyl, sec.-butyl, tert.-butyl, pentyl, isopentyl, neopentyl, hexyl and the like, either unsubstituted or substituted with such as (1) lower alkoxy of from 1 to about 3 carbon atoms, e.g., methoxy, ethoxy, propoxy and the like, (2) pyridyl, (3) mononuclear aryl, especially phenyl, either unsubstituted or substituted with halo, (4) amino, of formula,

wherein
$R^5$ represents (a) hydrogen, (b) lower alkyl of from 1 to about 5 carbon atoms, e.g., methyl, ethyl, propyl, isopropyl, butyl, isobutyl, sec.-butyl, pentyl, isopentyl, neopentyl and the like, (c) lower alkylcarbonyl, of from 2 to about 3 carbon atoms, e.g., acetyl, propionyl, and the like;
$R^6$ represents (a) hydrogen, (b) lower alkyl, of from 1 to about 5 carbon atoms, e.g., methyl, ethyl, propyl, isopropyl, butyl, isobutyl, sec.-butyl, pentyl, isopentyl, neopentyl, and the like;
$R^5$ and $R^6$ when lower alkyl can be linked together either directly or through a hetero atom such as nitrogen or oxygen to form a saturated heterocycle of 5–6 members with the nitrogen to which they are attached, e.g., piperidino, pyrrolidinyl, morpholino, piperazinyl, N-lower alkyl-piperazinyl, and the like;
$R^2$ represents hydrogen or lower alkyl of 1 to about 3 carbon atoms such as methyl, ethyl and propyl; and
$R^1$ and $R^2$ when lower alkyl can be linked together either directly or through a hetero atom such as nitrogen or oxygen to form a saturated heterocycle of 5–6 members with the nitrogen atom to which they are attached, e.g., piperidino, pyrrolidinyl, morpholino, piperazinyl, N-lower alkyl-piperazinyl, and the like.

The novel process of this invention involves a rearrangement of Compound I and subsequent ring closure to Compound II, and can be conducted either neat or in solution. The process comprises either heating Compound I in basic to neutral aqueous solution or in a solvent such as pyridine, quinoline or collidine at from 25° to about 100° C. for from one-half to about 2 hours, or by fusion of the starting material.

The products of the process of this invention are orally active, relatively non-toxic, highly effective antihypertensive agents with a moderate degree of diuretic and saluretic activities. They can be administered in the form of pills, tablets, capsules, elixirs, injectable preparations, and the like, in compositions which comprise one or more of the compounds of Formula II as the only active ingredient or in combination with other therapeutic ingredients. The compounds are advantageously administered at a dosage range of from about 5 mg. per day to about 750 mg. per day per 70 kg. of body weight. The dosage can be given in subdivided amounts on a two-four time a day regimen.

Compounds of Formula II are tautomeric in nature and exist as 1H-imidazo[4,5-b]pyrazin-2-ones (the structure shown in Formula II) and as the corresponding 1H-imidazo[4,5-b]pyrazin-2-ols (the structures shown by Formulae IIa and IIb) as follows:

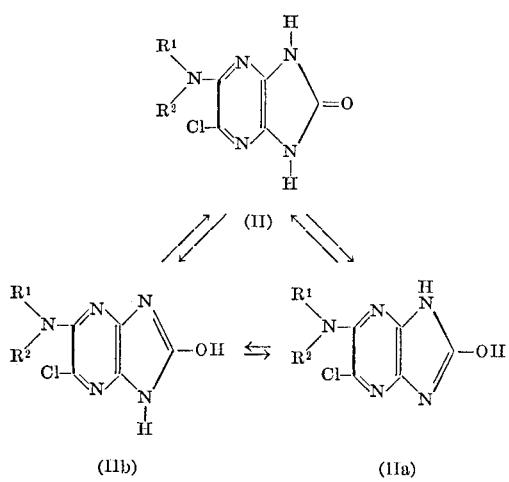

Although the enol forms represented by Formulae IIa and IIb may comprise a significant or predominant form of a given compound, for the sake of brevity, only one form is referred to throughout this specification. It should be understood, however, that the present invention is inclusive of the production of compounds represented by all tautomeric structures.

The novel starting materials for the process of this invention are prepared according to the following reaction schemes:

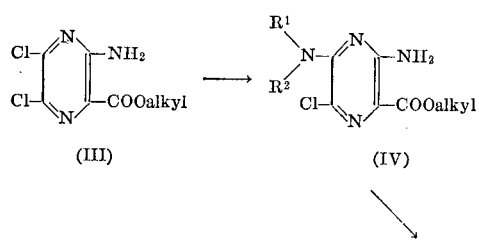

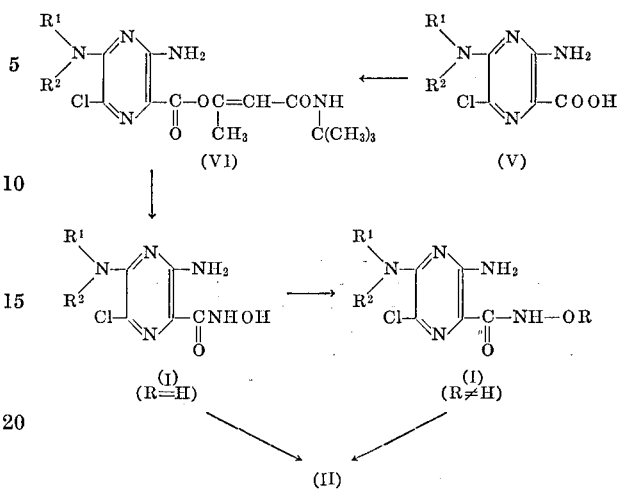

Compound IV is prepared by treating III in alcohol solution with an appropriately substituted amine. Conversion to V results from standard ester saponification techniques. The preparation of Compound VI is accomplished by treating the carboxylic acid V with n-(t-butyl)-5-methylisoxazolium perchlorate. The hydroxamic acid I (R=H) is then prepared by treatment of VI with hydroxylamine which is then further converted to I(R≠H) by reaction with the appropriate acyl chloride, or sulfonyl chloride.

The details of the reaction conditions for the various steps are readily apparent from the following preparations and examples.

PREPARATION 1

3-amino-5-ethylamino-6-chloropyrazinohydroxamic acid

Step A: Preparation of methyl 3-amino-5-ethylamino-6-chloropyrazinoate.—A suspension of methyl 3-amino-5-6-dichloropyrazinoate (178 g., 0.8 mole) in 2-propanol (1.1 liters) is stirred while ethylamine (4.4 moles) in 2-propanol (2 liters) is added, and the mixture is refluxed for an hour. The product that separates on cooling is collected by filtration and dried. The yield is 89%. After recrystallization from 2-propanol, the methyl 3-amino-5-ethylamino-6-chloropyrazinoate melts at 149–150° C.

Analysis.—Calculated for $C_8H_{11}ClN_4O_2$ (percent): C, 41.66; H, 4.81; N, 24.29. Found (percent): C, 42.11; H, 5.05; N, 24.24.

Step B: Preparation of 3-amino-5-ethylamino-6-chloropyrazinoic acid.—A mixture of finely ground methyl 3-amino-5-ethylamino-6-chloropyrazinoate (0.5 mole), isopropyl alcohol (1875 ml.) and 5% aqueous sodium hydroxide solution (625 ml.) is heated under reflux with vigorous stirring for 1 hour. Water (7500 ml.) is added to the cooled reaction mixture and the resulting clear solution is made acid to congo red paper by the addition of concentrated hydrochloric acid. The light yellow solid which separates is collected and dried. Recrystallization provides 3-amino-5-ethylamino-6-chloropyrazinoic acid.

Step C: Preparation of N-(t-butyl)-3-methyl-3-(3-amino - 5 - ethylamino - 6 - chloropyrazinoyloxy)acrylamide.—A mixture of 3 - amino - 5-ethylamino-6-chloropyrazinoic acid (0.01 mole), triethylamine (0.01 mole) and dimethylformamide (20 ml.) is stirred for 10 minutes. N-(t-butyl)-5-methyl isoxazolium perchlorate (2.40 g., 0.01 mole) is added and the resulting solution is stirred for 2 hours. Water (100 ml.) is added and the solid which separates is collected and dried. Recrystallization from acetonitrile provides pure N-(t-butyl)-3-methyl-3 - (3 - amino - 5 - ethylamino - 6-chloropyrazinoyloxy) acrylamide.

Step D: Preparation of 3 - amino - 5 - ethylamino - 6-chloropyrazinohydroxamic acid.—N - (t-butyl)-3-methyl-3 - (3 - amino - 5 - ethylamino-6-chloropyrazinoyloxy) acrylamide (0.3 mole) is dissolved in a minimum amount of tetrahydrofuran. Hydroxylamine (35 ml. of 10 M aqueous solution) is added and the solution is stirred for one hour. The solvent is removed under reduced pressure and the residue is recrystallized from methanol-water to afford 3-amino-5-ethylamino-6-chloropyrazinohydroxamic acid, M.P. 185–186° C.

Following the procedure described in Preparation 1, Steps A, B, C and D but substituting for the ethylamine utilized in Step A an equivalent amount of an amine of structure $NHR^1R^2$ followed by the saponification of Step B, esterification of Step C and treatment with hydroxamic acid as in Step D, there are produced the 3 - amino - 5-$NR^1R^2$-6-chloropyrazinohydroxamic acids described in Table I according to the following equation.

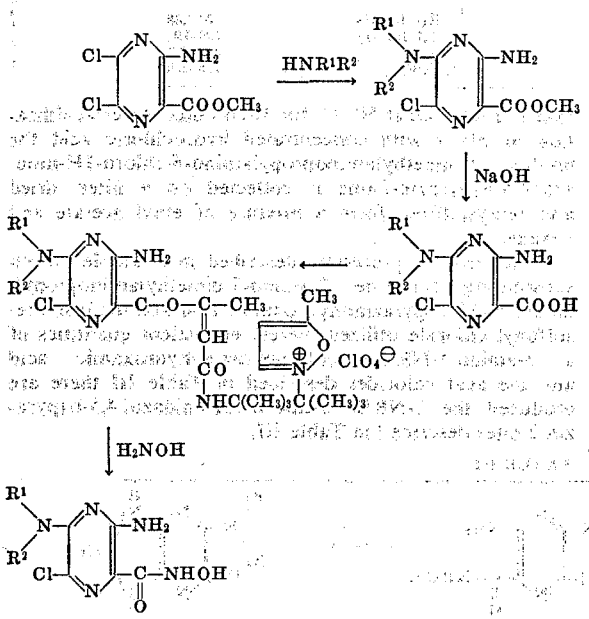

TABLE I

| Preparation: | $R^1$ | $R^2$ |
|---|---|---|
| 2 | $CH_3OCH_2CH$ | H |
| 3 | pyridyl-CH₂— | H |
| 4 | pyridyl-CH₂— | H |
| 5 | $CH_3CONH(CH_2)_2$— | H |
| 6 | $i-PrNH(CH_2)_3$— | H |
| 7 | $CH_3CONH(CH_2)_3$— | H |
| 8 | $(C_2H_5)_2NCH_2CH_2$— | H |
| 9 | $(CH_3)_2NH—(CH_2)_3$— | H |
| 10 | $(CH_3)_2N(CH_2)_4$— | H |
| 11 | pyrrolidinyl—$(CH_2)_2$— | H |
| 12 | $CH_3N$-piperazinyl-$N(CH_2)_3$— | H |
| 13 | morpholinyl-$N(CH_2)_3$— | H |
| 14 | $CH_3(CH_2)_2$— | $CH_3$— |
| 15 | | $C_2H_5$ |
| 16 | | $-CH_2CH_2-N-C_2H_4CH_2-$ / $-CH_2CH_2O-CH_2CH_2-$ |
| 17 | $CH_3$\\$N(CH_2)_2$— / $n-C_4H_9$ | H |
| 18 | $(CH_3)_2N(CH_2)_3$— | $CH_3$— |
| 19 | $(C_2H_5)_2N(CH_2)_2$— | $CH_3$— |
| 20 | $COCH_3$ \| $CH_3-N-(CH_2)_2$— | H |
| 21 | $CH_3$— | $CH_3$— |
| 22 | $C_2H_5$— | $C_2H_5$— |
| 23 | H | H |
| 24 | $CH_3$— | H |
| 25 | $n-C_3H_7$— | H |
| 26 | $CH_2=CHCH_2$— | H |
| 27 | $n-C_4H_9$— | H |
| 28 | $i-C_3H_7$— | H |
| 29 | $i-C_4H_9$— | H |
| 30 | cyclopentyl | H |
| 31 | $Cl$-phenyl-$CH_2$— | H |
| 32 | pyridyl-$CH_2$— | H |
| 33 | $(CH_3)_2N(CH_2)_2$— | H |
| 34 | phenyl | H |
| 35 | $C_2H_5$— | $CH_3$— |
| 36 | $-(CH_2)_5-$ | |
| 37 | $-(CH_2)_2-N-(CH_2)_2-$ \| $CH_3$ | |

EXAMPLE 1

5-ethylamino-6-chloro-1H-imidazo[4,5-b]pyrazin-2-one

3 - amino - 5 - ethylamino - 6 - chloropyrazinohydroxamic acid (3.0 g., from Preparation 1) is heated at its melting point (185° C.) in an oil bath for 15 minutes after fusion is complete. After cooling, the solid mass is recrystallized from a mixture of ethyl acetate and hexane to give 5-ethylamino-6-chloro-1H-imidazo[4,5-b]pyrazin-2-one, M.P. 248–249° C.

EXAMPLE 2

5-dimethylaminoethylamino-6-chloro-1H-imidazo [4,5-b]pyrazin-2-one

Benzene sulfonyl chloride (0.1 mole) is added dropwise to a stirred solution of 3-amino-5-dimethylaminoethylamino-6-chloropyrazinohydroxamic acid (0.1 mole, from Preparation 34) in 1 N sodium hydroxide solution (200 ml.). The reaction mixture is stirred at 25° C. for one hour, then acidified at 0° C. to pH 4 with dilute hydrochloric acid. The product that precipitates is collected by filtration, dried and recrystallized to give 5-dimethylaminoethylamino - ethylamino - 6 - chloro - 1H-imidazo[4,5-b]pyrazin-2-one.

Employing the procedures substantially as described in Example 2 but substituting for the 3-amino-5-dimethylaminoethylamino-6-chloropyrazinohydroxamic acid and the benzenesulfonyl chloride utilized therein, equivalent quantities of 3-amino-5-$NR^1R^2$-6-chloropyrazinohydroxamic acid and the sulfonyl chloride as identified in Table II there are produced the 5-$NR^1R^2$-6-chloro-1H-imidazo [4,5-b]pyrazin-2-ones also described in Table II.

TABLE II

| Starting material from preparation | R¹ | R² | R | M.P. (°C.) |
|---|---|---|---|---|
| Example: | | | | |
| 3 | 2  CH₃OCH₂CH₂— | H | C₆H₅SO₂— | 229–231 |
| 4 | 3  (pyridin-2-yl)CH₂— | H | CH₃—C₆H₄—SO₂— | 280 |
| 5 | 4  (pyridin-4-yl)CH₂— | H | CH₃—C₆H₄—SO₂— | 271–272 |
| 6 | 5  CH₃CONH(CH₂)₂— | H | CH₃CH₂SO₂— | 235–238 |
| 7 | 6  i-PrNH(CH₂)₃— | H | CH₃CH₂SO₂— | 190–192 |
| 8 | 7  CH₃CONH(CH₂)₃— | H | CH₃SO₂— | 226–227 |
| 9 | 8  (C₂H₅)₂N(CH₂)₂— | H | CH₃SO₂— | 276–278 |

EXAMPLE 10

5-dimethylaminopropylamino-6-chloro-1H-imidazo[4,5-b]pyrazin-2-one

A solution of benzenesulfonyl chloride (0.1 mole) and 3 - amino - 5 - dimethylaminopropylamino - 6 - chloropyrazinohydroxamic acid (0.1 mole, from Preparation 9) in 100 ml. of pyridine is warmed at 50° C. for 1 hour. After cooling the reaction mixture is quenched by pouring into an excess of ice-water mixture. After stirring until the ice has disappeared, the precipitate is collected by filtration and dried carefully.

The hydroxamic acid ester isolated above (0.1 mole) is dissolved in 100 ml. of 1 N ammonium hydroxide solution and warmed at 50° C. for 30 minutes. After acidification to pH 4 with concentrated hydrochloric acid the product 5-dimethylaminopropylamino-6-chloro-1H-imidazo[4,5-b]pyrazin-2-one is collected on a filter, dried and recrystallized form a mixture of ethyl acetate and hexane.

Following the procedure described in Example 10 but substituting for the 3-amino-5-dimethylaminopropylamino-6-chloropyrazinohydroxamic acid and the benzenesulfonyl chloride utilized therein equivalent quantities of a 3-amino-5-NR¹R²-6-chloropyrazinohydroxamic acid and the acid chlorides described in Table III there are produced the 5-NR¹R²-6-chloro-1H-imidazo[4,5-b]pyrazin-2-ones described in Table III.

TABLE III

| Starting material from preparation | R¹ | R | R² | M.P. (°C.) |
|---|---|---|---|---|
| Example: | | | | |
| 11 | 10  (CH₃)₂N(CH₂)₄— | H | C₆H₅SO₂— | 278–279 |
| 12 | 11  (piperidin-1-yl)—(CH₂)₂— | H | CH₃—C₆H₄—SO₂— | 149–150 |
| 13 | 12  CH₃N(piperazin-1-yl)—(CH₂)₃— | H | CH₃—C₆H₄—SO₂— | 167–169 |
| 14 | 13  (morpholin-4-yl)—(CH₂)₃— | H | CH₃CH₂SO₂— | 154–156 |
| 15 | 14  CH₃(CH₂)₂— | H | CH₃CH₂SO₂— | 215–216 |
| 16 | 15 | —(CH₂)₂—N(C₂H₅)—(CH₂)₂— | CH₃SO₂— | 307 |
| 17 | 16 | —(CH₂)₂—O—(CH₂)₂— | CH₃SO₂— | 212–273 |
| 18 | 17  N(CH₃)(n-C₄H₉)—(CH₂)₂— | H | CH₃CO— | 254–255 |
| 19 | 18  (CH₃)₂N(CH₂)₃— | H | CH₃CO— | 229–230 |
| 20 | 19  (C₂H₅)₂N(CH₂)₂— | H | C₆H₅CO— | 244 |
| 21 | 20  CH₃—N(COCH₃)—(CH₂)₂— | H | C₆H₅CO— | 227–228 |
| 22 | 21  CH₃— | CH₃— | C₆H₅CH₂CO— | 216–217 |
| 23 | 22  C₂H₅— | C₂H₅— | C₆H₅CH₂CO— | 207–208 |
| 24 | 23  H | H | CH₃CH₂CO— | >300 |
| 25 | 24  CH₃— | H | CH₃CH₂CO— | >280 |

EXAMPLE 26

5-propylamino-6-chloro-1H-imidazo[4,5-b]pyrazin-2-one

A solution of benzenesulfonyl chloride (0.1 mole) and 3-amino-5-n-propylamino - 6 - chloropyrazinohydroxamic acid (0.1 mole, from Preparation 25) in 100 ml. of 1 N sodium hydroxide solution is warmed at 50° C. for 1 hour. After diluting largely with water and cooling to 5° C. a precipitate forms which is collected on a filter, washed well with water and dried.

The hydroxamic acid ester isolated above (0.1 mole) is dissolved in 100 ml. of 1 N ammonium hydroxide solution and warmed at 50° C. for 30 minutes. After acidification to pH 4 with dilute hydrochloric acid the product 5-propylamino - 6 - chloro-1H-imidazo[4,5-b]pyrazin-2-one precipitates and is collected by filtration, dried and recrystallized from a mixture of ethyl acetate and hexane. It has a M.P. 215–216° C.

Employing the procedure of Example 26 but substituting for the 3-amino-5-n-propylamino-6-chloropyrazino-hydroxamic acid and the benzenesulfonyl chloride utilized therein equivalent quantities of the 3-amino-5-$NR^1R^2$-6-chloropyrazinohydroxamic acids and the acid chlorides described in Table IV there are produced the 5-$NR^1R^2$-6-chloro-1H-imidazo[4,5-b]pyrazin-2-ones also described in Table IV.

The above formulation employing more or less active ingredients or a combination of active ingredients can be employed to prepare capsules of the other novel compounds of this invention hereinbefore described.

FORMULATION 2

[Inhalation aerosol containing 0.1 mg. of 5-ethylamino-6-chloro-1H-imidazo[4,5-b]pyrazin-2-ones]

| | Per container | Per 150 containers |
|---|---|---|
| 5-ethylamino-6-chloro-1H-imidazo[4,5-b]pyrazin-2-one, gms. | 0.020 | 3.0 |
| Freon 11, gms. | 0.530 | 79.5 |
| Freon 12/114, gms. | 13.450 | 2517.5 |

Procedure: A concentrate containing 3 gm. 5-ethylamino - 6 - chloro - 1H - imidazo[4,5-b]pyrazin - 2 - one more and 79.5 gm. Freon 11 (trichlorofluoromethane) in a 250 ml. capacity plastic coated bottle containing approximately 100 gm. of 6 mm. glass beads is roller milled for 48 hours to reduce the drug to a particle size of less than 10μ. A sufficient quantity of the milled concentrate (0.55 gm.) cooled to an appropriate temperature is transferred to each of the pre-cooled containers. The required amount of Freon 12/114 (dichlorodifluoromethane/1,2-dichloro-1,1,2,2-tetrafluoroethane) is added and the container is sealed under pressure with a metering valve fitted with a plastic actuator and mouthpiece.

TABLE IV

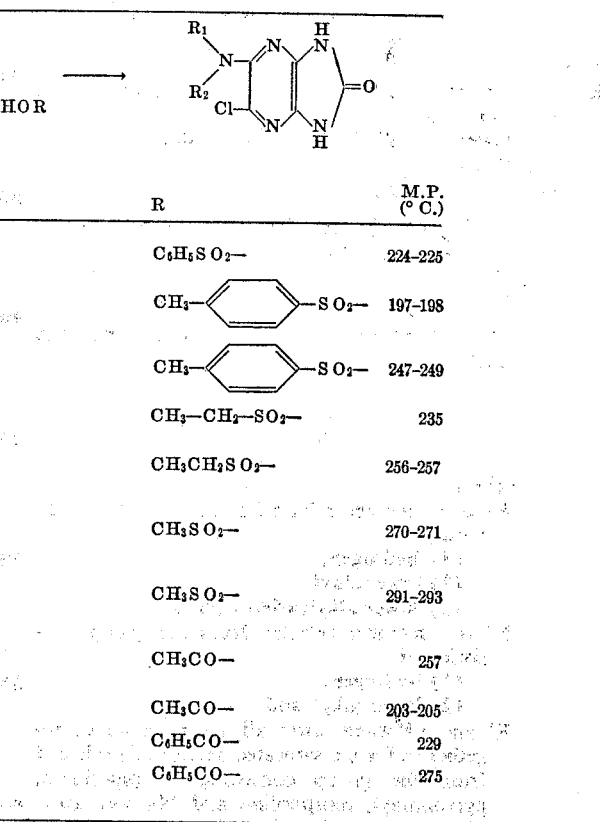

| Example | Starting material from preparation | $R^1$ | $R^2$ | R | M.P. (°C.) |
|---|---|---|---|---|---|
| 27 | 26 | $CH_2=CHCH_2-$ | H | $C_6H_5SO_2-$ | 224–225 |
| 28 | 27 | $n\text{-}C_4H_9-$ | H | $CH_3-\langle\text{C}_6H_4\rangle-SO_2-$ | 197–198 |
| 29 | 28 | $i\text{-}C_3H_7-$ | H | $CH_3-\langle\text{C}_6H_4\rangle-SO_2-$ | 247–249 |
| 30 | 29 | $t\text{-}C_4H_9-$ | H | $CH_3-CH_2-SO_2-$ | 235 |
| 31 | 30 | cyclopropyl | H | $CH_3CH_2SO_2-$ | 256–257 |
| 32 | 31 | $Cl-\langle\text{C}_6H_4\rangle-CH_2-$ | H | $CH_3SO_2-$ | 270–271 |
| 33 | 32 | $N\langle\text{pyridyl}\rangle-CH_2-$ | H | $CH_3SO_2-$ | 291–293 |
| 34 | 34 | $C_6H_5-$ | H | $CH_3CO-$ | 257 |
| 35 | 35 | $C_2H_5-$ | $CH_3-$ | $CH_3CO-$ | 203–205 |
| 36 | 36 | \multicolumn{2}{c}{$-(CH_2)_5-$} | $C_6H_5CO-$ | 229 |
| 37 | 37 | \multicolumn{2}{c}{$-(CH_2)_2-N(CH_2)_2-$ ; $CH_3$} | $C_6H_5CO-$ | 275 |

Formulation 1

Dry filled capsule containing 50 mg. of active ingredient per capsule:

| | Mg. |
|---|---|
| 5-ethylamine-6-chloro - 1H-imidazo[4,5-b]pyrazin-2-one | 50 |
| Lactose | 275 |
| Mixed powders | 325 |

Mix the 5 - ethylamino - 6 - chloro - 1H - imidazo [4,5 - b]pyrazin - 2 - one and lactose and reduce to a No. 60 mesh powder. Encapsulate, filling 325 mg. in each No. 2 capsule.

FORMULATION 3

[Inhalation aerosol containing 0.5 mg. of 5-ethylamino-6-chloro-1H-imidazo[4,5-b]pyrazin-2-one]

| | Per container | Per 150 containers |
|---|---|---|
| 5-ethylamino-6-chloro-1H-imidazo[4,5-b]pyrazin-2-one, gm. | 0.1 | 2.00 |
| Freon 11, gm. | 0.5 | 10.00 |
| Ascorbic acid, gm. | 0.0035 | .070 |
| Anhydrous ethanol, gm. | 0.56 | 11.2 |
| Freon 12/114, gm. | 14.00 | 280.00 |

Procedure: The drug is dispersed in the Freon 11 (trichlorofluoromethane), milled to the desired particle size in the manner described in Formulation 2 and subdivided into the individual containers. Sufficient Freon 12/114 (dichlorodifluoromethane/1,2 - dichloro - 1,1,2,2 - tetrafluoroethane) is added to each container. The ascorbic acid dissolved in the anhydrous ethanol is likewise subdivided into individual containers. All operations are performed at an appropriately chosen temperature. Finally, the containers are sealed in the manner described in Formulation 2. Dosage forms containing from 0.2 to 1.0 mg. of active ingredient per spray can be prepared in a manner identical to that described above.

While the invention has been described with particular reference to certain variables in the process conditions and compound substituents, it is to be understood that the invention embraces related processes and substituents which are obvious extensions of those disclosed.

What is claimed is:

1. A process for the preparation of 5-NR$^1$R$^2$-6-chloro-1H-imidazo[4,5-b]pyrazin-2-ones of structural formula

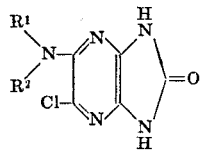

wherein
R$^1$ is a member selected from the group consisting of
 (a) hydrogen,
 (b) lower cycloalkyl of 3–7 carbon atoms,
 (c) phenyl,
 (d) lower alkenyl,
 (e) lower alkyl,
 (f) lower(alkoxy-alkyl),
 (g) pyridyl-lower alkyl,
 (h) phenyl-lower alkyl,
 (i) halophenyl-lower alkyl,
 (j) amino-lower alkyl wherein the amino group is of formula

wherein
 R$^5$ is a member selected from the group consisting of
  (1) hydrogen,
  (2) lower alkyl,
  (3) lower alkylcarbonyl, and
 R$^6$ is a member selected from the group consisting of
  (1) hydrogen,
  (2) lower alkyl, and
 R$^5$ and R$^6$ when lower alkyl can be joined together to form a saturated heterocycle selected from the group consisting of piperidino, pyrrolidinyl, morpholino and N-lower alkyl piperazinyl; and R$^2$ is a member selected from the group consisting of hydrogen and lower alkyl,
R$^1$ and R$^2$ when lower alkyl can be joined together to form a saturated heterocycle selected from the group consisting of piperidino, pyrrolidinyl, morpholino and N-lower alkyl piperazinyl which comprises heating a compound of structural formula

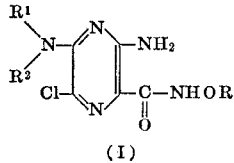

(I)

wherein
R is a member selected from the group consisting of
 (a) hydrogen,
 (b) lower alkylcarbonyl,
 (c) phenyl-lower alkylcarbonyl,
 (d) phenylcarbonyl,
 (e) lower alkylsulfonyl,
 (f) phenylsulfonyl, and
 (g) lower alkyl-phenylsulfonyl.

2. The process as claimed in claim 1, wherein R$^1$ is lower alkyl, R$^2$ is hydrogen, and R is as defined in claim 1.

3. The process as claimed in claim 1 wherein R$^1$ is ethyl, R$^2$ is hydrogen, and R is as defined in claim 1.

4. The process as claimed in claim 1, wherein R$^1$ is di(lower alkyl) amino-lower alkyl, R$^2$ is hydrogen and R is as defined in claim 1.

5. The process as claimed in claim 1 wherein R$^1$ is dimethylaminoethyl, R$^2$ is hydrogen, and R is as defined in claim 1.

6. A process for the preparation of 5-ethylamino-6-chloro - 1H - imidazo[4,5 - b]pyrazin - 2 - one which comprises heating 3 - amino - 5 - ethylamino - 6 - chloropyrazinohydroxamic acid to its melting point.

7. A process for the preparation of 5-dimethylaminoethylamino - 6 - chloro - 1H - imidazo[4,5-b]pyrazin-2-one which comprises heating benzenesulfonyl 3-amino-5-dimethylaminoethylamino-6-chloropyrazinohydroxamate.

8. A compound of structural formula

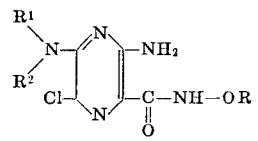

wherein

R is a member selected from the group consisting of
 (a) hydrogen,
 (b) lower alkylcarbonyl,
 (c) phenyl-lower alkylcarbonyl,
 (d) phenylcarbonyl,
 (e) lower alkylsulfonyl,
 (f) phenylsulfonyl, and
 (g) lower alkyl-phenylsulfonyl,
R$^1$ is a member selected from the group consisting of
 (a) hydrogen,
 (b) lower cycloalkyl of 3–7 carbon atoms,
 (c) phenyl,
 (d) lower alkenyl,
 (e) lower alkyl,
 (f) lower(alkoxy-alkyl),
 (g) pyridyl-lower alkyl,
 (h) phenyl-lower alkyl,
 (i) halophenyl-lower alkyl,
 (j) amino-lower alkyl wherein the amino group is of formula

wherein

R$^5$ is a member selected from the group consisting of
  (1) hydrogen,
  (2) lower alkyl,
  (3) lower alkylcarbonyl, and
 R$^6$ is a member selected from the group consisting of
  (1) hydrogen,
  (2) lower alkyl, and
 R$^5$ and R$^6$ when lower alkyl can be joined together to form a saturated heterocycle selected from the group consisting of piperidino, pyrrolidinyl, morpholino and N-lower alkyl piperazinyl; and $R^2$ is a member selected from the group consisting of hydrogen and lower alkyl, $R^1$ and $R^2$ when lower alkyl can be joined together to form a saturated heterocycle selected from the group consisting of piperidino, pyrrolidinyl, morpholino and N-lower alkyl piperazinyl.

9. The compound of claim 8, wherein R is hydrogen.

10. The compound of claim 8 wherein $R^1$ is lower alkyl and $R^2$ is hydrogen.

11. The compound of claim 8 wherein $R^1$ is ethyl and $R^2$ is hydrogen.

12. The compound of claim 8 wherein $R^1$ is ethyl, and R and $R^2$ are hydrogen.

13. The compound of claim 8, wherein $R^1$ is di-(lower alkyl)amino-lower alkyl and $R^2$ is hydrogen.

14. The compound of claim 8 wherein $R^1$ is di-(methyl)aminoethyl and $R^2$ is hydrogen.

15. The compound of claim 8 wherein $R^1$ is di-(methyl)aminoethyl and R and $R^2$ are hydrogen.

References Cited
UNITED STATES PATENTS

| | | | |
|---|---|---|---|
| 3,361,748 | 1/1968 | Cragoe et al. | 260—250 |
| 3,410,850 | 11/1968 | Cragoe et al. | 260—250 |

NICHOLAS S. RIZZO, Primary Examiner

U.S. Cl. X.R.

260—247.2; 424—250